US012080449B2

(12) United States Patent
Godard et al.

(10) Patent No.: US 12,080,449 B2
(45) Date of Patent: Sep. 3, 2024

(54) POWER CONDUCTOR AND SYSTEM

(71) Applicant: ERICO International Corporation, Solon, OH (US)

(72) Inventors: Pascal Godard, St. Georges Haute Ville (FR); Frederic Bizet, Chatillon d'Azergues (FR)

(73) Assignee: ERICO International Corporation, Solon, OH (US)

( * ) Notice: Subject to any disclaimer, the term of this patent is extended or adjusted under 35 U.S.C. 154(b) by 241 days.

(21) Appl. No.: 17/498,347

(22) Filed: Oct. 11, 2021

(65) Prior Publication Data

US 2022/0102025 A1 Mar. 31, 2022

Related U.S. Application Data

(63) Continuation of application No. 16/868,409, filed on May 6, 2020, now Pat. No. 11,145,434.

(60) Provisional application No. 62/845,139, filed on May 8, 2019.

(51) Int. Cl.

| | |
|---|---|
| ***H01B 7/22*** | (2006.01) |
| ***H01B 1/02*** | (2006.01) |
| ***H01B 7/08*** | (2006.01) |
| ***H01B 9/00*** | (2006.01) |
| ***H01R 13/58*** | (2006.01) |

(52) U.S. Cl.
CPC ............ *H01B 7/228* (2013.01); *H01B 1/023* (2013.01); *H01R 13/5812* (2013.01)

(58) Field of Classification Search
CPC . H01B 5/12; H01B 7/228; H01B 7/08; H01B 1/023; H01B 9/006; H01R 13/5812
See application file for complete search history.

(56) References Cited

U.S. PATENT DOCUMENTS

| | | | |
|---|---|---|---|
| 1,560,308 | A | 11/1925 | Perry |
| 1,789,951 | A | 1/1931 | Terrell et al. |
| 2,253,550 | A | 8/1941 | Bohn |
| 2,939,905 | A | 6/1960 | Canfield |

(Continued)

FOREIGN PATENT DOCUMENTS

| | | | |
|---|---|---|---|
| CN | 2819406 | Y | 9/2006 |
| CN | 2879357 | Y | 3/2007 |

(Continued)

OTHER PUBLICATIONS

WiMo, Control Cables, product list, Copyright 2019 WiMo Antennen und Elektronik GmbH, Inc., 2 pages.

(Continued)

*Primary Examiner* — Hoa C Nguyen
*Assistant Examiner* — Amol H Patel
(74) *Attorney, Agent, or Firm* — Quarles & Brady LLP

(57) ABSTRACT

A power conductor can include a plurality of copper-clad aluminum wires that are braided together to form a power braid. The power conductor can include an insulating sheath configured to enclose at least a portion of the power braid. The power conductor can be configured for use a power distribution system, and can be configured to electrically connect a transformer with a power distribution modules. The power conductor can be configured to connect to a conductive palm of the transformer and to a conductive contact of the power distribution module.

20 Claims, 15 Drawing Sheets

(56) References Cited

U.S. PATENT DOCUMENTS

| | | | | | |
|---|---|---|---|---|---|
| 3,587,030 | A | | 6/1971 | Ohnsorg et al. | |
| 3,692,924 | A | | 9/1972 | Nye | |
| 3,706,955 | A | * | 12/1972 | Bunnell | H01B 7/0009 174/126.1 |
| RE28,526 | E | | 8/1975 | Ziemek | |
| 4,196,960 | A | | 4/1980 | Gelfand | |
| 4,426,550 | A | | 1/1984 | Luhman et al. | |
| 4,431,862 | A | * | 2/1984 | Luhman | H01F 6/06 428/930 |
| 4,973,370 | A | | 11/1990 | Kreinberg | |
| 5,268,534 | A | | 12/1993 | Gailey et al. | |
| 5,411,646 | A | * | 5/1995 | Gossett | C23F 13/16 205/734 |
| 5,541,380 | A | * | 7/1996 | Ogden | H01R 43/0214 219/56.22 |
| D400,169 | S | | 10/1998 | Endo | |
| 6,121,547 | A | | 9/2000 | Harada | |
| 7,491,886 | B2 | | 2/2009 | Fazakas | |
| 7,692,098 | B2 | | 4/2010 | Wyatt, II et al. | |
| 8,124,875 | B2 | | 2/2012 | Aitken et al. | |
| 8,574,008 | B2 | | 11/2013 | Grose et al. | |
| 8,618,413 | B2 | | 12/2013 | Catchpole et al. | |
| 8,946,560 | B2 | | 2/2015 | Kamidaki et al. | |
| 8,987,600 | B2 | | 3/2015 | Kamidaki et al. | |
| 9,117,570 | B2 | | 8/2015 | Park et al. | |
| 9,123,456 | B2 | | 9/2015 | Shinmoto et al. | |
| 9,293,232 | B2 | | 3/2016 | In et al. | |
| 9,324,476 | B2 | | 4/2016 | Caudill et al. | |
| 9,444,154 | B2 | | 9/2016 | Suso | |
| 9,455,068 | B2 | | 9/2016 | Omoto | |
| 9,478,328 | B2 | | 10/2016 | Shinmoto et al. | |
| 9,543,058 | B2 | | 1/2017 | Knerr et al. | |
| 9,859,630 | B2 | | 1/2018 | MacNaughton et al. | |
| 9,953,747 | B2 | | 4/2018 | Dolan et al. | |
| 10,076,892 | B2 | | 9/2018 | Song et al. | |
| 10,181,362 | B2 | | 1/2019 | Efraimsson et al. | |
| 10,199,138 | B2 | | 2/2019 | Caudill et al. | |
| 10,366,805 | B2 | | 7/2019 | Knerr et al. | |
| 2004/0151446 | A1 | | 8/2004 | Wyatt et al. | |
| 2004/0213532 | A1 | | 10/2004 | Wyatt et al. | |
| 2013/0008708 | A1 | | 1/2013 | Burke | |
| 2014/0138366 | A1 | | 5/2014 | Zhang et al. | |
| 2016/0093419 | A1 | * | 3/2016 | Shin | H01B 3/441 174/107 |
| 2017/0145580 | A1 | | 5/2017 | Dolan et al. | |
| 2017/0148547 | A1 | | 5/2017 | Dolan et al. | |
| 2017/0148550 | A1 | | 5/2017 | Dolan et al. | |
| 2017/0352451 | A1 | | 12/2017 | Campbell et al. | |
| 2018/0062332 | A1 | | 3/2018 | Kuboki et al. | |
| 2018/0322982 | A1 | | 11/2018 | Satou et al. | |
| 2018/0322983 | A1 | * | 11/2018 | Satou | H01R 43/048 |
| 2018/0358721 | A1 | | 12/2018 | Kioschis et al. | |
| 2019/0068020 | A1 | | 2/2019 | Knerr et al. | |
| 2019/0164660 | A1 | | 5/2019 | Dablement et al. | |
| 2019/0172608 | A1 | * | 6/2019 | Shimizu | H01B 5/12 |
| 2019/0279784 | A1 | | 9/2019 | Knerr et al. | |

FOREIGN PATENT DOCUMENTS

| | | | |
|---|---|---|---|
| CN | 2893866 | Y | 4/2007 |
| CN | 201191522 | Y | 2/2009 |
| CN | 201191523 | Y | 2/2009 |
| CN | 201191524 | Y | 2/2009 |
| CN | 201191525 | Y | 2/2009 |
| CN | 201251939 | Y | 6/2009 |
| CN | 201378466 | Y | 1/2010 |
| CN | 102142298 | A | 8/2011 |
| CN | 102412006 | A | 4/2012 |
| CN | 202758622 | U | 2/2013 |
| CN | 203165488 | U | 8/2013 |
| CN | 203311863 | U | 11/2013 |
| CN | 104157338 | A | 11/2014 |
| CN | 105568073 | A | 5/2016 |
| CN | 205790421 | U | 12/2016 |
| CN | 205944457 | U | 2/2017 |
| CN | 207367648 | U | 5/2018 |
| CN | 208001009 | U | 10/2018 |
| CN | 108777192 | A | 11/2018 |
| EP | 3437110 | A1 | 2/2019 |
| EP | 3443563 | A1 | 2/2019 |
| IN | 296073 | | 6/2010 |
| JP | 2002208314 | A | 7/2002 |
| JP | 2017143018 | A | 8/2017 |
| JP | 6062593 | A | 1/2018 |
| JP | 6116740 | A | 1/2018 |
| KR | 200438877 | Y1 | 3/2008 |
| KR | 20160148360 | A | 12/2016 |
| TW | 201044727 | A | 12/2010 |
| WO | 2013134939 | A1 | 9/2013 |
| WO | 2015118974 | A1 | 8/2015 |
| WO | 2017060340 | A1 | 4/2017 |
| WO | 2019102981 | A1 | 5/2019 |

OTHER PUBLICATIONS

WiMo, Ground Strap, product list, Copyright 2019 WiMo Antennen und Elektronik GmbH, Inc., 1 page.

Enameled aluminium/copper flate winding wire for transformer, Copyright 1999-2020 Alibaba.com, 8 pages.

Yueging Chenmi Power Electric Co., Limited, China Suppliers good quality green yellow ground wire flexible grounding copper earth braids, Copyright 1999-2020 Alibaba.com, 4 pages.

Yueging Chenmi Power Electric Co., Limited, Electrical copper clad aluminum braid jumper wire, Copyright 1999-2020 Alibaba.com, 7 pages.

Jiangsu Greenshine Supcon Tech Co., Ltd., Free sample copper clad aluminum cca twisted electrical wire, Copyright 1999-2020 Alibaba.com, 8 pages.

Wenzhou Junkai Electrical Co., Ltd., China Manufacturer hot sales Flat flexible copper braid connector for distribution box, 1990-2020 Alibaba.com, 10 pages.

Inventor W.J. Hammer, Safety Catch for Electrical Circuits, Patent No. 368765, patent date Aug. 23, 1887, 5 pages.

Inventor E.R. Knowles, Battery Connector, Patent No. 482012, patent date September 6, 1892, 3 pages.

Electrical & Grounding Connections Wind Turbine product sheet, Copyright 2008 ERICO International Corporation, 2 pages.

Flexible Conductors (North America) Solutions to Optimize the Design of Electrical Power and Grounding & Bonding Connections; catalog literature, Copyright 2000 nVent, 56 pages.

Druseidt Elektrotechnik: "Flexible connectors—Solderless terminals—Contact systems", Sep. 27, 2012, retrieved from internet, https://www1.druseidt.de/pdf/0205eng.pdf [retrieved on Feb. 9, 2022], pp. 1-15.

* cited by examiner

| HV / LV TRANSFORMER 400 / 410V AT SECONDARY | NOMINAL TRANSFORMER CURRENT (A) | COPPER CABLE | ALUMINUM CABLE | BUSDUCT USAGE | POWER BRAID PER PHASE |
|---|---|---|---|---|---|
| 400kVA | 560 | 1x240mm$^2$ ○ | 2x240mm$^2$ ○○ | | 1x250mm$^2$ ▯ |
| 500kVA | 704 | 2x185mm$^2$ ○○ | 3x240mm$^2$ ○○○ | | 2x370mm$^2$ ▯ |
| 630kVA | 900 | 2x240mm$^2$ ○○ | 4x240mm$^2$ ○○○○ | | 1x500mm$^2$ ▯ |
| 800kVA | 1120 | 3x185mm$^2$ ○○○ | 4x240mm$^2$ ○○○○ | | 1x630mm$^2$ ▯ |
| 1000kVA | 1400 | 4x185mm$^2$ ○○○○ | 4x300mm$^2$ ○○○○ | | 1x800mm$^2$ ▯ |
| 1250kVA | 1750 | 4x240mm$^2$ ○○○○ | 4x400mm$^2$ ○○○○ | | 1x1000mm$^2$ ▯ |
| 1600kVA | 2253 | 5x240mm$^2$ ○○○○○ | | BUSDUCT | 1x1250mm$^2$ ▯ |
| 2000kVA | 2816 | 6x240mm$^2$ ○○○○○○ | | BUSDUCT | 2x1000mm$^2$ ▯▯ |
| 2500kVA | 3520 | 8x240mm$^2$ ○○○○○○○○ | | BUSDUCT | 2x1250mm$^2$ ▯▯ |
| 3150kVA | 4435 | | | BUSDUCT | |

FIG. 14A

| POWER TRNASFORMER | NOMINAL TRANSFORMER CURRENT (A) | POWER BRAID PER PHASE | INSTALL. TIME | ALUMINUM CABLE | INSTALL. TIME | COPPER CABLE | INSTALL. TIME |
|---|---|---|---|---|---|---|---|
| 400kVA | 560 | 1x250mm$^2$ ▯ | 6H | 2x240mm$^2$ | 24H | 1x240mm$^2$ | 18H |
| 500kVA | 704 | 2x370mm$^2$ ▯ | 7H | 3x240mm$^2$ | 28H | 2x185mm$^2$ | 22H |
| 630kVA | 900 | 1x500mm$^2$ ▯ | 8H | 4x240mm$^2$ | 32H | 2x240mm$^2$ | 24H |
| 800kVA | 1120 | 1x630mm$^2$ ▯ | 9H | 4x240mm$^2$ | 32H | 3x185mm$^2$ | 26H |
| 1000kVA | 1400 | 1x800mm$^2$ ▯ | 10H | 4x300mm$^2$ | 34H | 4x185mm$^2$ | 32H |
| 1250kVA | 1750 | 1x1000mm$^2$ ▯ | 11H | 4x400mm$^2$ | 36H | 4x240mm$^2$ | 32H |
| 1600kVA | 2253 | 1x1250mm$^2$ ▯ | 12H | | | 5x240mm$^2$ | 48H |
| 2000kVA | 2816 | 2x1000mm$^2$ ▯▯ | 16H | | | 6x240mm$^2$ | 52H |
| 2500kVA | 3520 | 2x1250mm$^2$ ▯▯ | 18H | | | 8x240mm$^2$ | 60H |
| 3150kVA | 4435 | | | | | | |

FIG. 14B

POWER CONDUCTOR AND SYSTEM

CROSS-REFERENCE TO RELATED APPLICATIONS

This application is a continuation of U.S. application Ser. No. 16/868,409, filed on May 6, 2020, which claims priority under 35 USC 119 from U.S. Provisional Patent Application No. 62/845,139, filed on May 8, 2019. The above applications are all incorporated herein by reference in their entireties.

BACKGROUND

In some electrical grids, high-to-low voltage transformers or other electrical modules can supply power to power distribution modules, which may distribute the power to individual power taps or access points. For example, a transformer can be linked to a power distribution module that supplies power to the lights, outlets, and any other electronic devices in a residential home or a commercial space. Similarly, other transmission of low voltage power between modules may also be useful in a variety of contexts.

SUMMARY

Some embodiments of the invention provide a low voltage power conductor configured to supply power from a transformer to a power distribution module. The low voltage power conductor can include a plurality of copper-clad aluminum wires that may be braided into a power braid. The power braid can be configured to be attached to the transformer and the power distribution module at single respective attachment points.

Some embodiments of the invention provide a power distribution system for distributing power from an electrical grid. The power distribution system can include a transformer connected to the power grid, a power distribution module, and a low voltage power conductor, which may be configured to electrically link the power distribution module to the transformer. The low voltage power conductor can include a plurality of copper-clad aluminum wires braided into a power braid.

Some embodiments of the invention provide a low voltage power distribution system to supply power from a transformer to a power distribution module via a conductive palm. A low voltage power conductor can include a plurality of copper-clad aluminum wires that are braided into a power braid. A clamp can include a clamp body and a clamp spacer, the clamp spacer including a base portion and at least two legs extending from opposing sides of the base portion. The clamp can secure the power braid to the conductive palm with the base portion of the clamp spacer interposed between the power braid and the conductive palm, and with the at least two legs extending to opposing sides of the power braid to limit deformation of the power braid upon compression of the power braid by the clamp.

Some embodiments of the invention provide a method of transferring electrical power between electrical modules. A low voltage power conductor can be provided. A clamp spacer can be arranged between the low voltage power conductor and a conductive contact of one of the electrical modules, with a base portion of the clamp spacer in contact with the low voltage power conductor to provide an electrical connection between the low voltage power conductor and the conductive contact, and with at least two legs of the clamp spacer extending from opposing sides of the base portion, away from the conductive contact, along opposing sides of the low voltage power conductor. The low voltage power conductor can be clamped to the conductive contact, with the at least two legs of the clamp spacer limiting deformation of the low voltage power conductor upon compression of the low voltage power conductor by the clamping operation.

Some embodiments of the invention provide a low voltage power distribution system to supply power between electrical modules via a conductive contact of one of the electrical modules, for use with a low voltage power conductor. A clamp can include a clamp body and a clamp spacer. The clamp spacer can be formed as an single, integral conductive component that includes a base portion and at least two legs that extend from two opposing sides of the base portion. The base portion can be configured to provide electrical conduction between the low voltage power conductor and the conductive contact, with the legs extending away from the conductive contact along opposing sides of the low voltage power conductor to limit deformation of the low voltage power conductor upon compression of the lower voltage power conductor by the clamp body.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIGS. 14A and 14B are tables including example installation details for power braids according to embodiments of the invention.

DETAILED DESCRIPTION

Figure 1:
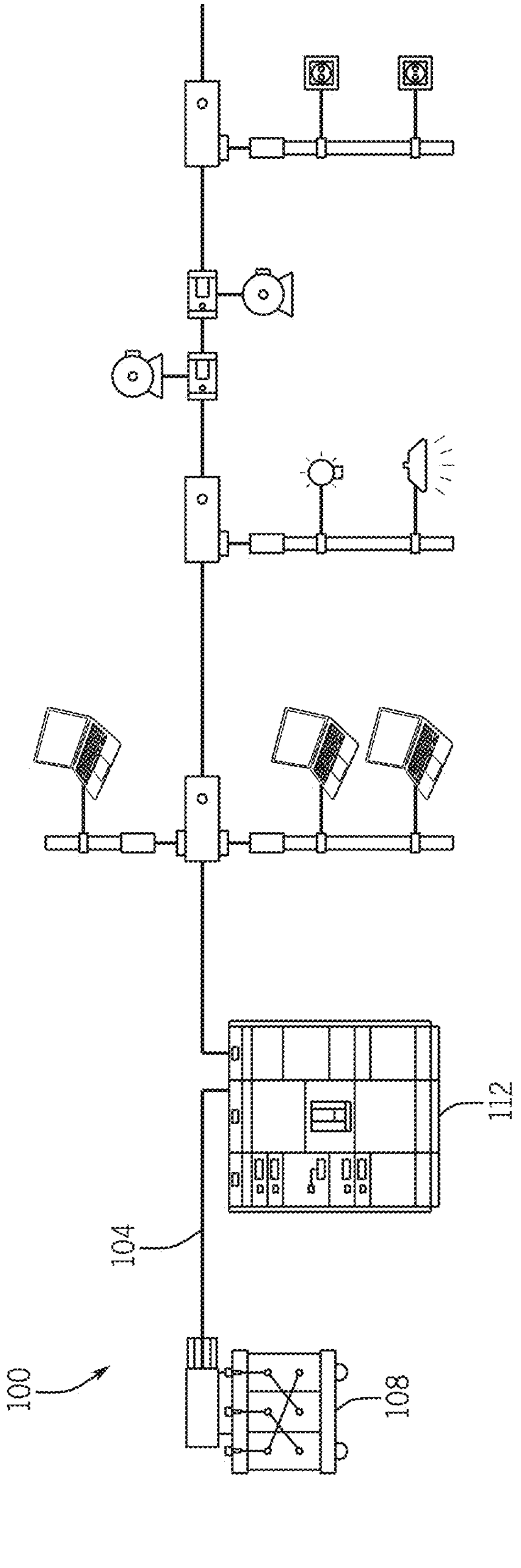
FIG. 1 is a schematic view of a power distribution system according to an embodiment of the invention, the power distribution system including a transformer, a power distribution module, and a low voltage power conductor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to electrically link a high-to-low voltage transformer to a power distribution module or otherwise provide for transmission of low voltage electrical power between different electrical modules. Embodiments of the invention can be useful for this purpose, and others. For example, embodiments of the invention may include a power braid of braided wires that is configured to supply power from a transformer to a power distribution module. In some embodiments, a power braid can be formed from a plurality of copper-clad aluminum wires, each one having an aluminum core covered by a copper layer. The copper-clad aluminum wires may be grouped into multiple different wire bundles, which can be braided together to form the power braid. In some embodiments, a power braid can have an oblong cross-section, or may be sheathed in an insulating material. Some embodiments of the invention can be lightweight and flexible, which may allow for quick and easy installation. In some embodiments, a power braid can have a high current-carrying capacity, which may reduce the number of connection that are needed between the transformer and the power distribution module.

As further examples, some embodiments can include systems and components thereof, including power braids in some cases, for providing power connections between electrical modules (e.g., between transformers and power distribution modules). For example, some embodiments can include power clamps that can readily secure power braids (or other conductors) to a variety of other components. In some embodiments, power clamps can be configured to prevent excessive deformation of conductors when the power clamps are used to secure the conductors to other components.

Figure 2:
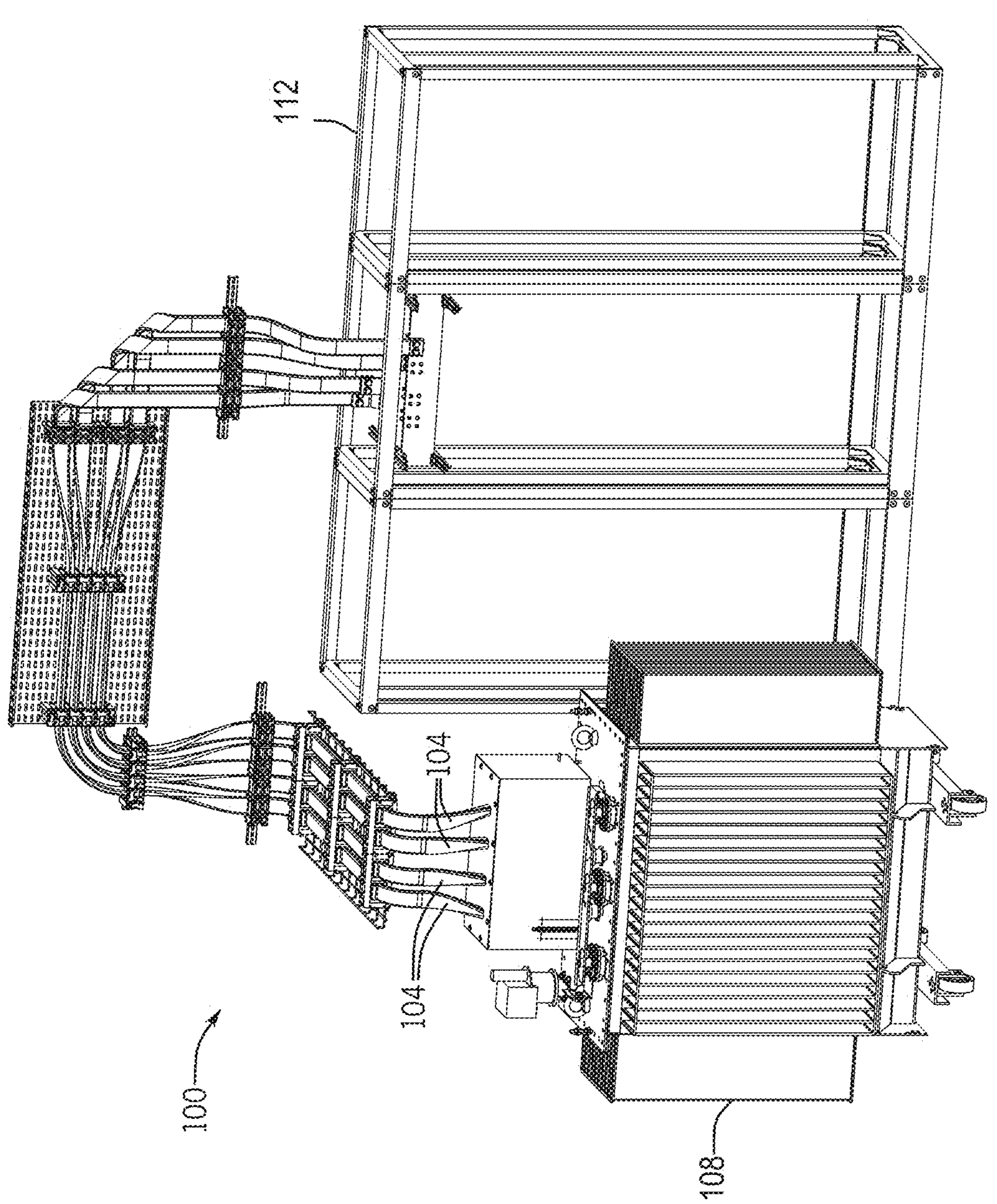
FIG. 2 is a detailed isometric view of part of the power distribution system of FIG. 1 according to an embodiment of the invention.

FIGS. 1 and 2 illustrate example configurations of a power distribution system 100 configured to distribute power from an electrical grid, according to some embodiments of the invention. Although embodiments of the invention can be used in other settings, the illustrated configuration may be particularly advantageous in some cases. As shown in FIG. 2 in particular, in the illustrated embodiment, the power distribution system 100 includes a set of low voltage power conductors 104 that are attached to a transformer 108 and a power distribution module 112 (e.g., switch cabinet) at single respective attachment points for each of the conductors 104 at the transformer 108 and the power distribution module 112, respectively. The low voltage power conductors 104 are configured to electrically link the power distribution module 112 to the transformer 108, which is connected to the power grid, thereby supplying power to the power distribution module 112. From the power distribution module 112, power can then be distributed to other electronics over various types, including by using similar conductors to the conductors 104 or others.

In the embodiment illustrated, the low voltage power conductor 104 is configured to provide a single conductive connector per phase, although other configurations are possible. For example, a similar arrangement can include multiple connectors per phase between a transformer and a power distribution module (or between other electrical equipment), such as may facilitate transmission of more current for particular applications. In some such arrangements, each connector may be configured to utilize its own respective attachment point, such as may be provided by an attachment lug or other device.

In some embodiments, a low voltage power conductor can include at least one power braid configured to be attached to, and carry current between, the transformer and the power distribution module. Generally, a power braid includes a plurality of conductors that are braided together in order to be capable of collectively transmitting current between spatially separated equipment.

Figure 3A:
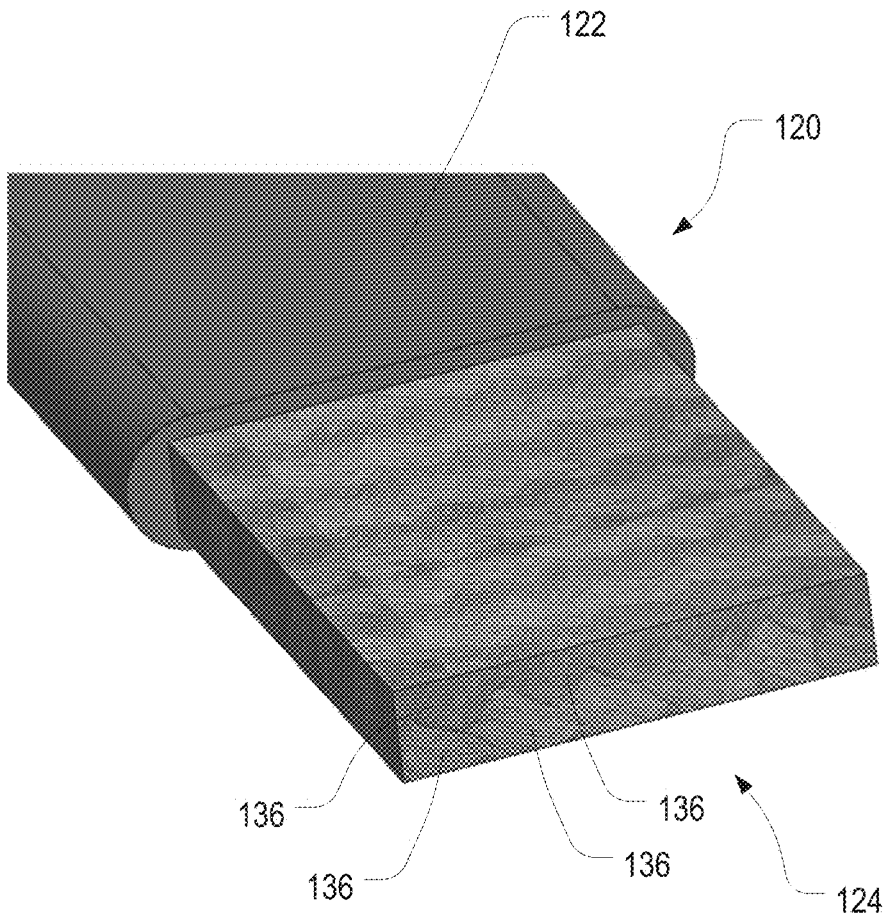
FIGS. 3A and 3B are detailed views of power braids according to an embodiment of the invention including an isometric view of an exposed braided section of a power braid and a cross-sectional view of a copper-clad aluminum wire of a power braid.
Figure 3B:
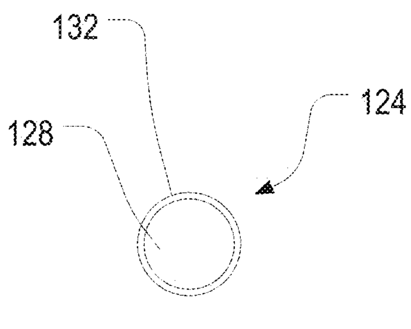

As one example, FIGS. 3A and 3B illustrate an embodiment of a power braid 120 that can be configured as part of the low voltage power conductor 104 of FIG. 1. The illustrated power braid 120 includes a plurality of individual wires which are braided together in order to form the power braid 120, as shown in particular in FIG. 3B, which also illustrates an insulating sheath 122. As appropriate, one or more of the power braids 120 can be utilized as the power conductor(s) 104 (see FIG. 1), in order to individually or collectively transmit electricity from the transformer 108 to the power distribution module 112. Further, in some embodiments, one or more of the power braids 120 can be similarly used (e.g., to provide low voltage power connections) in a variety of other contexts.

In the illustrated embodiment, the power braid 120 is formed from copper-clad aluminum wires 124. As shown in FIG. 3B in particular, each of the copper-clad aluminum wires 124 has an aluminum core 128 that is clad in a copper layer 132 that surrounds an outer surface of the aluminum core 128. In some embodiments, this combination of materials may provide some advantages over single-metal wires or wires of other compositions. For example, use of the aluminum core 128 can help to reduce the weight of a copper-clad aluminum wire 124 relative to other comparable wires, with corresponding weight savings for the power braid 120 in general, for a given current-carrying capacity. As another example, the copper layer 132 may be useful to protect the aluminum core 128 from corrosion, and may correspondingly allow for installations with reduced (e.g., eliminated) use of electrical grease or other contact lubricant. The copper layer 132 can also provide a contact surface that is more conductive than an aluminum wire alone. In some embodiments, at least one of the copper-clad aluminum wires can be coated in a layer of tin, which may provide additional corrosion resistance, such as may be appropriate in some environments. Additionally or alternatively, some embodiments may be coated in layers of other materials.

As noted above the power braid 120 is illustrated as including the insulating sheath 122. A variety of known dielectric materials can be used for the sheath 122 in order to provide appropriate protection for the current-carrying wires 124. Further, as shown in FIG. 3A, some parts of the sheath 122 can be stripped away (or otherwise removed or not included) in order to expose the wires 124 for electrical connections. In some embodiments, as further discussed below, exposed portions of a low voltage conductor can be left unadorned in order to allow for clamped or other conductive connections. In some embodiments, exposed portions of a low voltage conductor can be equipped with adapters to allow for bolt-on or other conductive connections. In some embodiments, one exposed end of a low voltage conductor can be left unadorned whereas an opposite exposed end of the low voltage conductor can be equipped with an adapter. In some embodiments, multiple exposed ends of a low voltage conductor can be processed similarly (e.g., to be unadorned, or to include the same or different adapters).

In some embodiments, the size of copper-clad aluminum wires 124 may be based on at least one parameter of the power distribution system 100, such as the voltage and current that the low voltage conductor may need to carry. For example, a copper-clad aluminum wire may be configured to have a diameter between 0.05 millimeters and 3 millimeters, depending on the expected voltage or current of the relevant system. Another embodiment may include a copper-clad aluminum wire with a diameter that is smaller than 0.05 millimeters or a diameter that is larger than 3 millimeters. Some power braids can include a plurality of wires that are substantially the same diameter, and some power braids can include at least one wire that has a different diameter than at least one other wire.

With continued reference to FIG. 3A, in the illustrated embodiment, the copper-clad aluminum wires 124 are grouped into a plurality of wire bundles 136. The copper-clad aluminum wires 124 in each of the wire bundles 136 may be twisted together similarly to the wires in a cable (as shown), or they may be bundled in a different arrangement. Some wire bundles can include between 100 and 200 individual copper-clad aluminum wires. Other embodiments, however, can include at least one bundle with fewer than 100 copper-clad aluminum wires, or at least one bundle with more than 200 copper-clad aluminum wires.

In some embodiments, as also noted above, a power braid can be formed from braided bundles or braided individual wires. For example, as shown in FIG. 3A in particular, wire bundles 136 are braided together so that they are interwoven with each other. Braiding of wires into a power braid can be useful, for example, in order to provide substantial flexibility and low bending radii, as compared to conventional cables.

In different embodiments, different braiding patterns and cross-sectional profiles can be used. For example, the illustrated power braid 120 as shown in FIG. 3A is generally flat and has an oblong cross section that is substantially wider than it is tall. This may be helpful, for example, in order to provide a highly flexible low voltage power conductor without compromising its strength. Thus, for example, the power braid 120 (and other power braids according to embodiments of the invention) can be twisted, folded, bent, or otherwise substantially manipulated into any variety of shapes.

To achieve a flattened, oblong shape, wire bundles in some embodiments may be braided using a braid pattern that results in a generally flat braid. Other embodiments can be formed using a braid pattern that results in a differently-shaped structure that is then flattened. For example, wire bundles may be braided into a power braid with a generally round cross section, which may then be mechanically pressed into an oblong cross section. Additionally or alternatively, some embodiments can have a power braid that is not generally flat, or a power braid that does not have an oblong profile.

In the illustrated example, the power braid 120 exhibits a generally rectangular non-rounded, and symmetrical oblong shape. In other embodiments, other configurations are possible. For example, some oblong conductors according to the invention can exhibit rounded rectangular cross-sections, ovular cross-sections, or non-symmetrical oblong cross-sections. Other examples of cross-sectional profiles of power braids are exhibited for power braids 120*a*, 120*b*, 120*c*, 120*d*, 120*e* in FIGS. 4A through 4E. In particular, the power braids 120*a*, 120*c* exhibit an oblong ovular profile that is only partially flattened, and the power braids 120*b*, 120*d*, 120*e* exhibit an oblong rounded rectangular profile that is substantially flattened. Other geometries are also possible in other embodiments, including similar cross-sectional shapes with different aspect ratios.

As with the size of the constituent wires (e.g., the copper-clad aluminum wires 124 as shown in FIGS. 3A and 3B), the size of a power braid may be selected based on at least one parameter of the relevant power distribution system. For example, the properties of a power braid may be selected based on a desired current-carrying capacity of the power braid. In some embodiments, a power braid may be configured to have a current-carrying capacity that is between 25 amperes and 5000 amperes, or more narrowly, between 50 amperes and 2000 amperes, between 100 amperes and 2000 amperes, or between 400 amperes and 5000 amperes. Some embodiments, however, can be configured to have a current-carrying capacity that is less than 25 amperes, or a current-carrying capacity that is greater than 5000 amperes.

In some embodiments, depending on the necessary current-carrying capacity or other factors, a power braid may be configured to have a cross-sectional area that is between 25 square millimeters and 3000 square millimeters, or more narrowly, between 50 square millimeters and 1250 square millimeters. Other embodiments may include a power braid with a cross-sectional area that is smaller than 25 square millimeters, or a cross-sectional area that is larger than 3000 square millimeters. Amongst other things, the size of a power braid may be a function of at least one of the size of the copper-clad aluminum wires, the number of wires used in each wire bundle, or the number of wire bundles in the power braid. Additionally or alternatively, the size of a power braid may depend on other factors.

In some embodiments, use of braided power connections (i.e., power braids) can allow for effective electrical connections over a wide range of distances. For example, to link a transformer to a power distribution module, some power braids may be between 60 meters and 70 meters long. In other embodiments, a power braid may be shorter than 60 meters, or a power braid may be longer than 70 meters.

In some embodiments, as also noted above, a low voltage power conductor can include an insulating sheath, such as may be wrapped around or extruded over a power braid. This may be useful, for example, in order to protect the power braid from the environment, and to help prevent incidental contact with the power braid. In some embodiments, an insulating sheath can include multiple layers, including layers of the same or different materials. In some embodiments, the insulating sheath may be configured for a specific voltage that may be expected to be carried by the low voltage power conductor. For example, some insulating sheaths may be configured for a voltage that is between 300 volts and 3000 volts. Other embodiments may include an insulating sheath that is configured for use with a low voltage power conductor that withstands a voltage less than 300 volts or more than 3000 volts. Example insulating sheaths 122*a* through 122*e* are shown in FIGS. 4A through 4E.

Figure 4A:
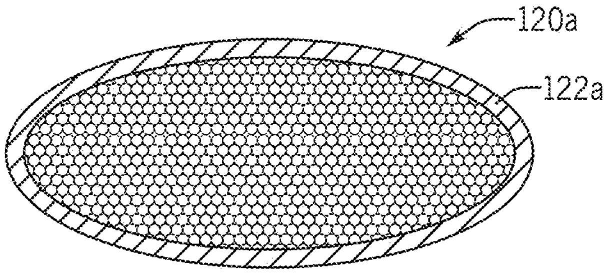
FIGS. 4A through 4E are cross-sectional views of different low voltage power conductors according to embodiments of the invention.
Figure 4B:
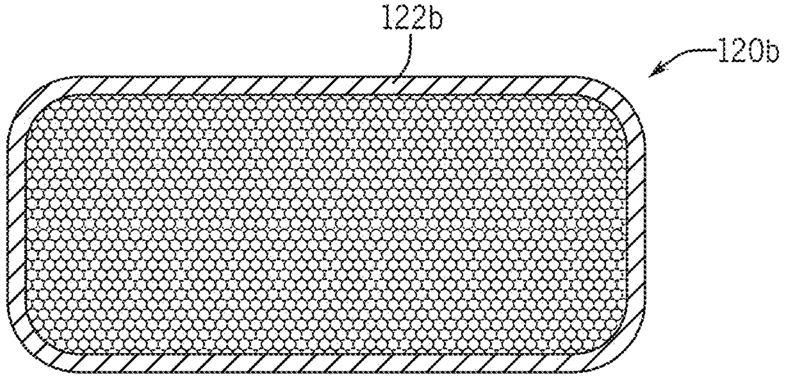
Figure 4C:
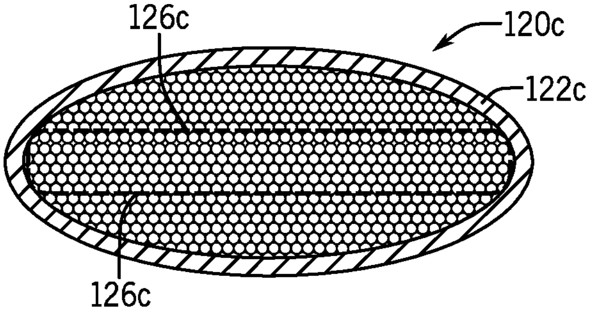
Figure 4D:
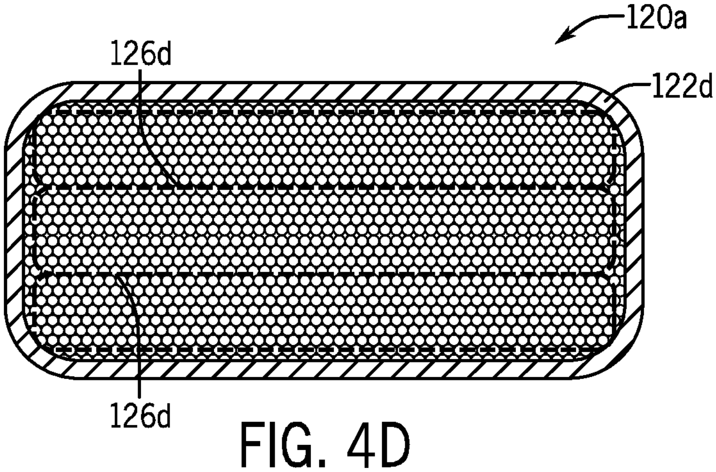
Figure 4E:
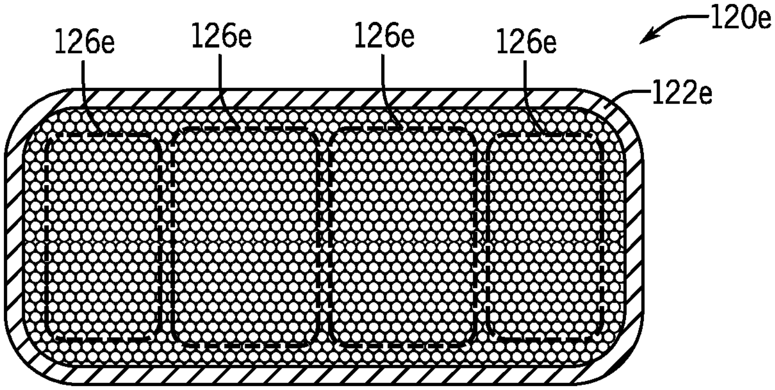

In some embodiments, a low voltage power conductor can include a plurality of power braids 120 arranged in parallel. In such embodiments, for example, the power braids can be stacked vertically on top of each other, arranged horizontally next to each other, of stacked and arranged vertically and horizontally. Some embodiments may include power braids that may be arranged in another pattern, or without any repeating pattern in particular. In some embodiments that include multiple power braids, an insulating sheath can be formed around each individual power braid. In some embodiments, an insulating sheath can be formed around a group of power braids, thereby enclosing multiple power braids in a single insulating sheath. For example, as indicated by separation lines 126*c*, 126*d*, 126*e* the power braids 120*c*, 120*d*, 120*e* as shown in FIGS. 4C and 4E are formed from multiple individual power braids surrounded by the single insulating sheaths 122*c*, 122*d*, 122*e*. Other similar configurations can also include internal power braids that are differently arranged (e.g., with different numbers or configurations of internal power braids, insulating sheaths, and so on).

Figure 5:
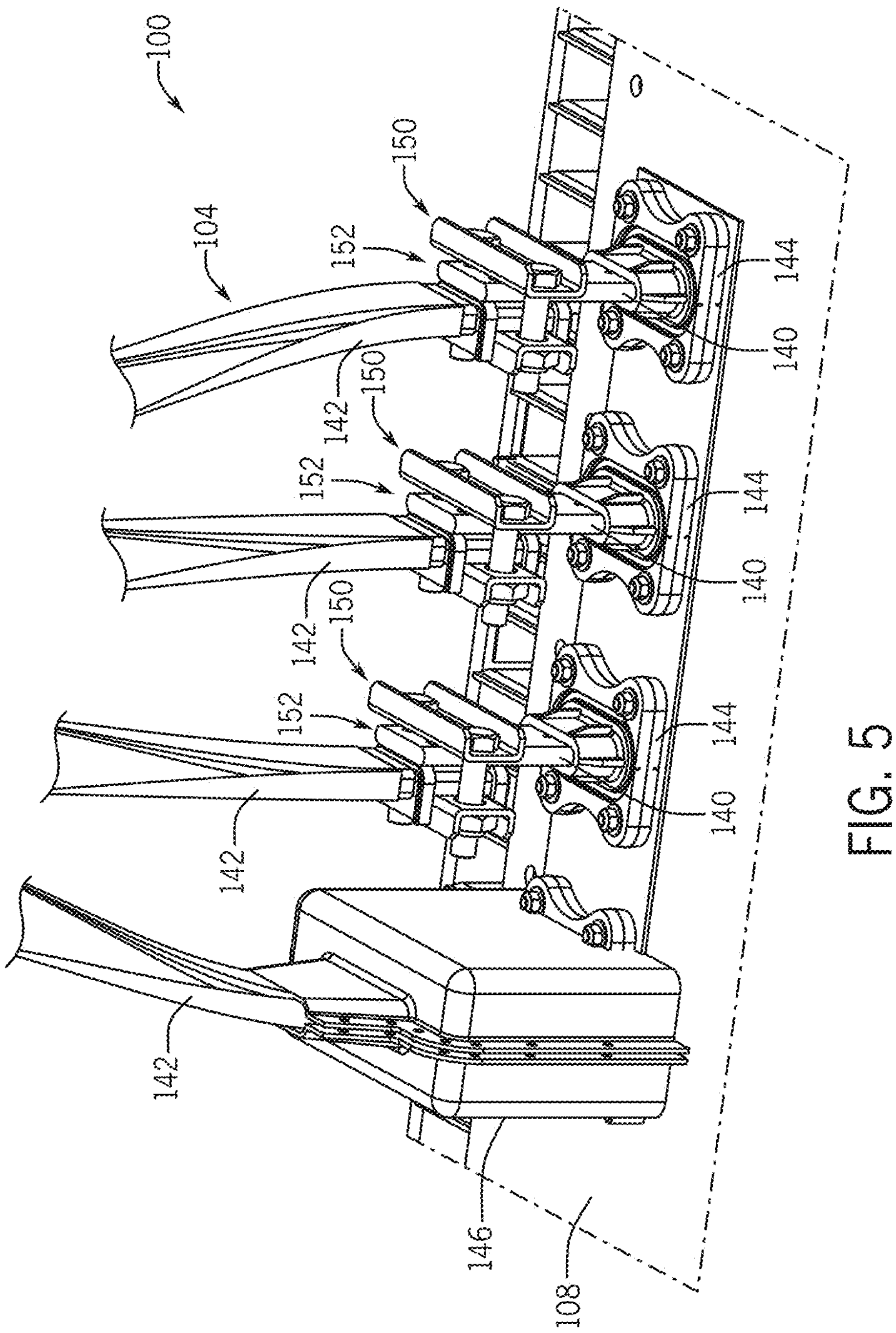
FIG. 5 is a detailed schematic view of power connections at a transformer of the power distribution system of FIG. 1.

In some embodiments, power braids or other low voltage conductors can be used in combination with other components, or other components can be used to also provide an improved power distribution system. In this regard, for example, FIG. 5 is a detailed schematic view of power connections between the conductors 104 and the transformer 108 of the power distribution system 100 of FIG. 1, with the conductors configured as power braids 142 similar to the power braid 120 of FIG. 3A. Although the illustrated configuration for the power connections may be advantageous in some cases, other configurations are also possible. For example, similar connections can be used to allow power transmission to or from other devices (e.g., power distribution modules) or different connections can be used to allow power transmission from a transformer.

In particular, in the illustrated example, the transformer 108 includes sets of conductive contacts formed as conductive palms 140, which are clamped to the corresponding power braids 142 for power transmission from the transformer 108. In the illustrated configuration, three of the palms 140 are secured and partly shielded using removable flanges 144 and one of the power braids 142 is protected by a removable boot 146, although a variety of other configurations are possible. Further, although some embodiments may differ, each of the power braids 142 is clamped to the respective palm 140 using a similar clamping arrangement 150. Accordingly, only one of the clamping arrangements 150 will be discussed in detail below.

Figure 6:
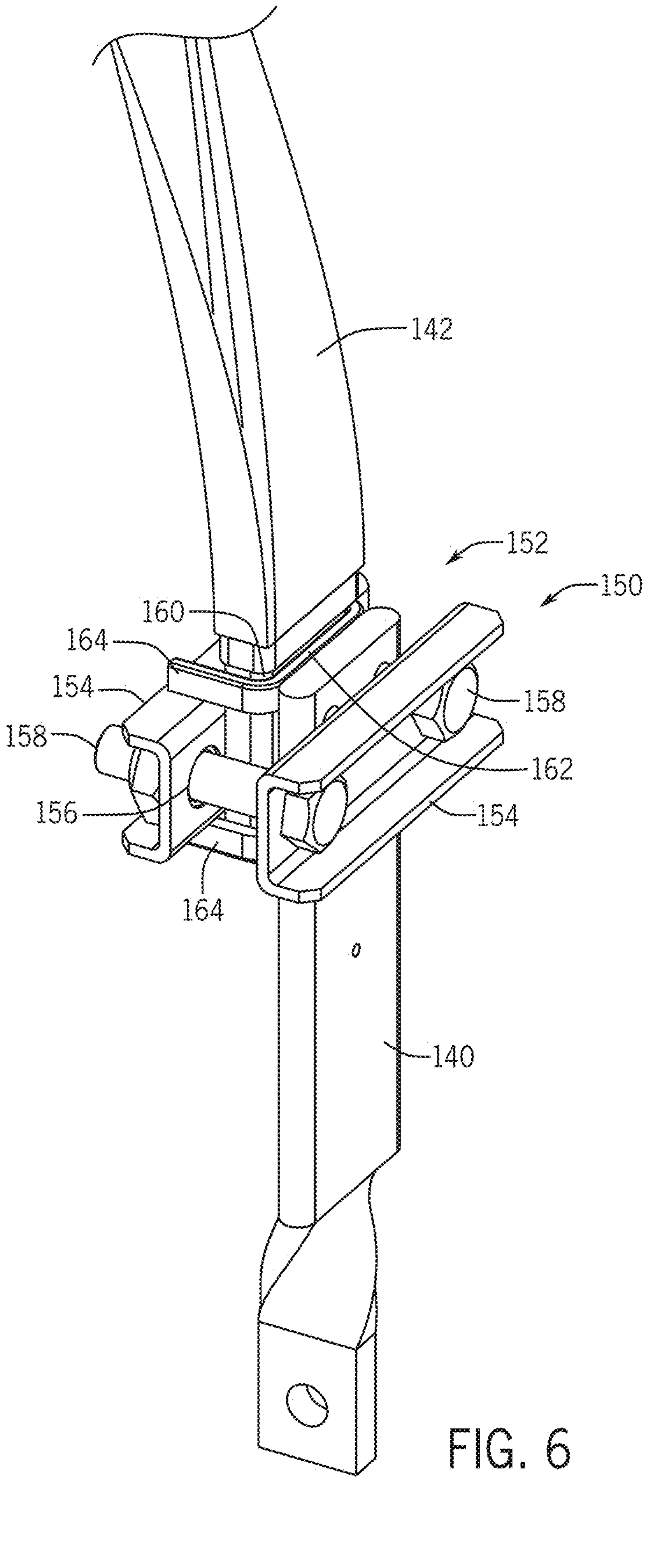
FIGS. 6 through 9 are isometric and exploded (FIG. 9) views of components of one of the power connections of FIG. 5 according to an embodiment of the invention.
Figure 7:
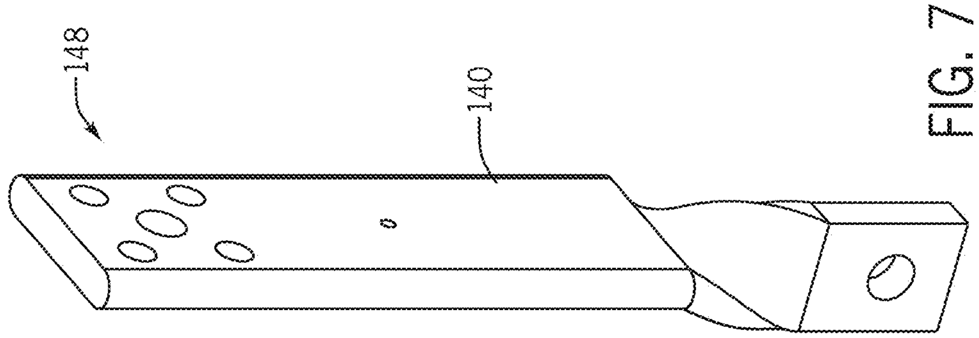

Referring now to FIGS. 6 and 7, the conductive palm 140 is formed as a solid bar with a quarter twist at a transformer end thereof and a mounting hole pattern 148 at an attachment end although a variety of other configurations are possible. In particular, the mounting hole pattern 148, can accommodate a variety of bolted connections with conductors. However, in the illustrated embodiment, a clamping arrangement 150 is used instead. In this regard, for example, some embodiments may include palms or other conductive contacts that include other types of mounting hole patterns, or no mounting hole patterns at all.

Figure 8:
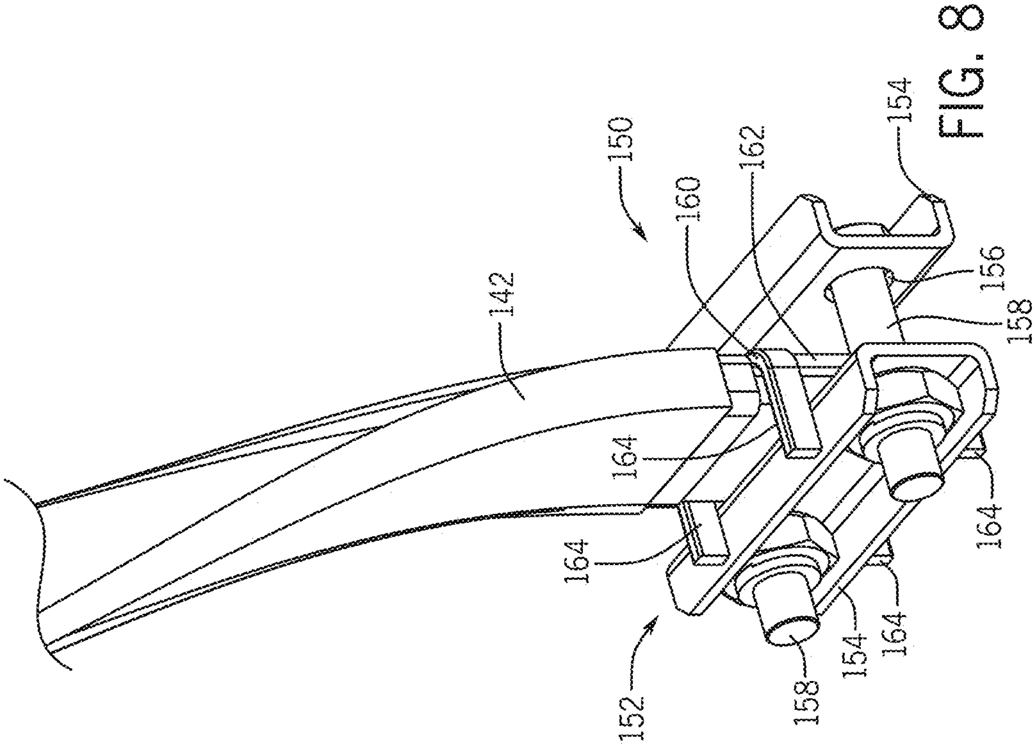

Referring also to FIG. 8, in the illustrated embodiment, the clamping arrangement 150 includes a clamp 152 that can be bolted onto a free end of the power braid 142 and the attachment end of the conductive palm 140 (see FIGS. 6 and 7) in order to provide a secure conductive connection between the power braid 142 and the palm 140. In particular, the clamp 152 includes a set of clamp bodies 154, which are collectively configured to be clamped onto other components placed therebetween. In different embodiments, different configurations of clamp bodies are possible. For example, in the illustrated configuration, the clamp bodies 154 are substantially similar (i.e., the same to within acceptable manufacturing tolerances), with symmetrically arranged flanges to provide a relatively strong U-shaped cross-section. Further, sets of bolt holes 156 are arranged with a lateral spacing therebetween that is somewhat larger than the width of the power braid 142. Thus, as shown in FIG. 6, for example, bolts 158 received through the bolt holes 156 can be used to urge the clamp bodies 154 into clamping engagement with the power braid 142 and the palm 140. In other configurations, for example, clamp bodies may be non-symmetrical or otherwise dissimilar from each other, may exhibit other cross-sectional profiles, or may be configured to be clamped onto other components using different arrangements of bolts or other mechanisms (e.g., cam devices, clasps, and so on).

Figure 9:
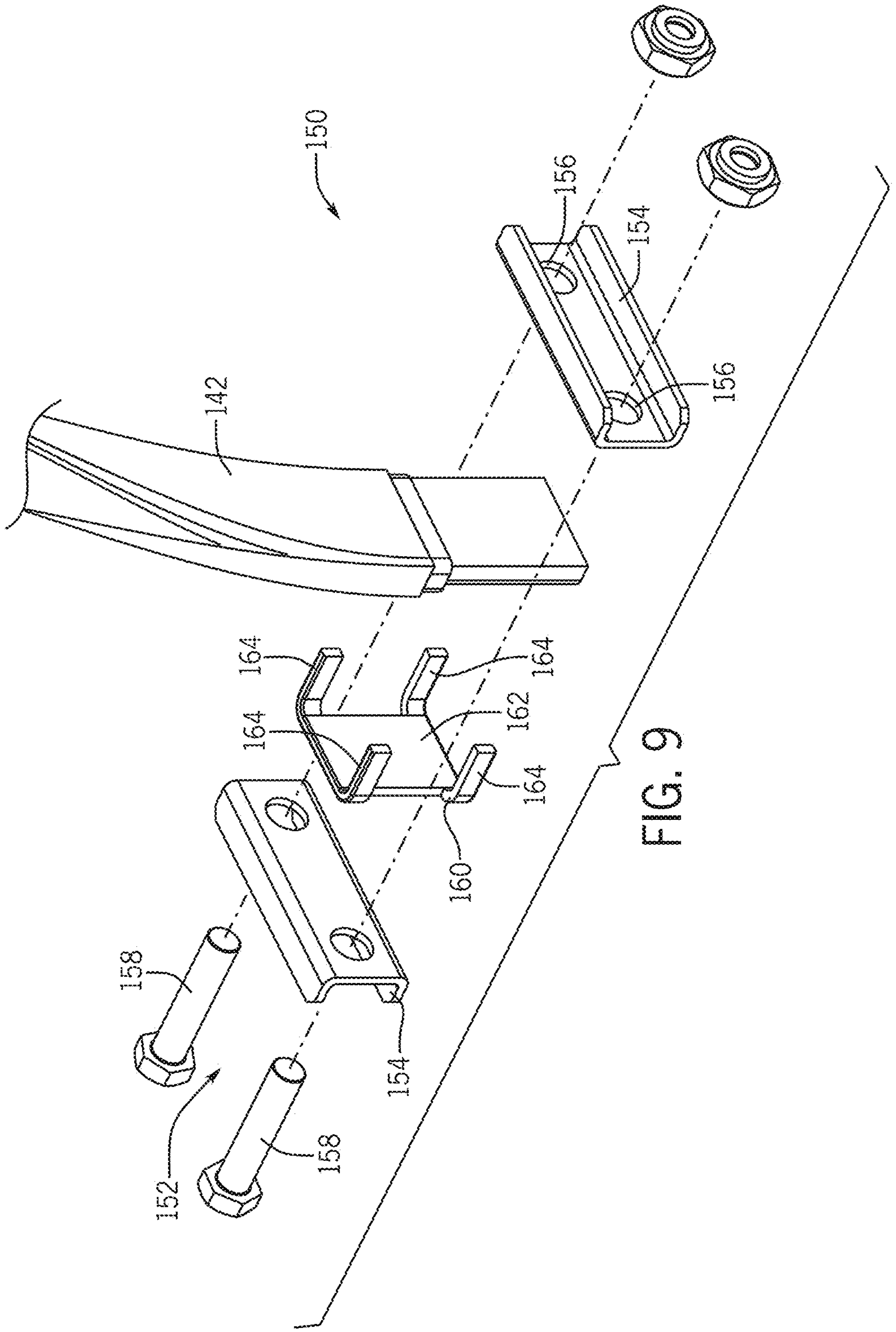

As shown in FIG. 9, in particular, the clamp 152 also includes a clamp spacer 160 that is configured to be secured between the power braid 142 and the conductive palm 140 (or other conductive contact). Generally, a clamp spacer is configured to provide a conductive connection between a lower voltage power conductor and a conductive contact of an electrical module (e.g., a transformer), while also spacing the power conductor somewhat apart from the conductive contact of the electrical module. In this regard, for example, the clamp spacer 160 is formed as a single-piece conductive (e.g., copper) body with a base portion 162 that is configured to contact the power braid 142 and the palm 140 and thereby provide a conductive spacer therebetween. In the illustrated embodiment, the base portion 162 is planar and generally smooth, although other configurations are possible, including roughened configurations to provide stronger gripping, or partial penetration of relevant surfaces upon clamping.

In some embodiments, a clamp spacer can help to appropriately locate a power conductor to be clamped and also protect the power conductor against excessive deformation during a clamping operation. In this regard, for example, some clamp spacers may include one or more legs extending from each of two opposing sides of the base portion thereof, with the legs being configured to extend along opposing sides of a power conductor in a clamping arrangement and thereby somewhat bound movement and deformation of the power conductor.

In particular, in the illustrated embodiment, the clamp spacer 160 includes two sets of two symmetrically arranged legs 164 (i.e., four of the legs 164 in total) that extend at right angles from opposing sides of the base portion 162. The legs 164 on each particular side of the base portion 162 are spaced apart from each other by a larger distance than a corresponding width of the clamp bodies 154 and extend away from the base portion 162 by a distance that is greater than the corresponding thickness of the power braid 142. Thus, as shown in FIGS. 6 and 8, in particular, the legs 164, the base portion 162, and a corresponding one of the clamp bodies 154 can form a sort of cage that partly surrounds and bounds lateral movement of the power braid 142. Further, with the clamp spacer 160 interposed between the power braid 142 and the conductive palm 140, as the clamp bodies 154 are tightened into clamping engagement with the power braid 142 and the conductive palm 140, the legs 164 can prevent excessive lateral deformation of the power braid 142 that might otherwise result from the clamping force applied by the clamp bodies 154, while the base portion 162 also provides a reliable and highly conductive connection between the power braid 142 and the palm 140.

Figure 10:
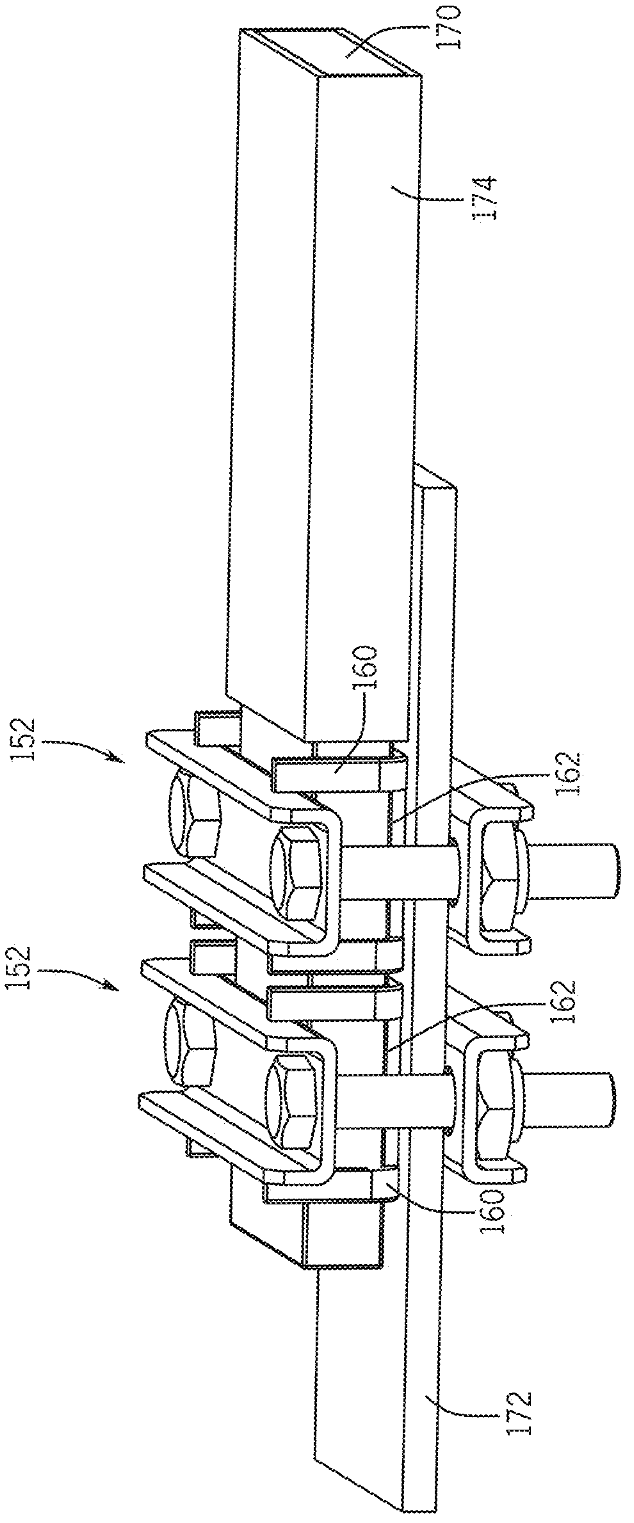
FIGS. 10 through 13C are isometric views of other power connections according to an embodiment of the invention.

Notably, the relatively simple configuration of the clamp 152, and of other similar clamps according to other embodiments, can allow for widely customizable engagement of power conductors in a variety of settings. In some embodiments, multiple clamps can be used, including as may provide a particularly secure and low-resistance engagement for a particular power conductor or conductive contact. For example, as shown in FIG. 10, multiple instances of the clamp 152, each with an associated one of the clamp spacers 160, can be used to secure a power braid 170 to a conductive contact 172 over a longer exposed length of the conductive wires of the power braid 170. This can result in a correspondingly enhanced conductive connection between the power braid 170 and the conductive contact 172 (and the associated electrical module), as well as increased mechanical retention of the power braid 170 on the contact 172.

The configuration of FIG. 10 also illustrates another advantage provided by the use of a clamp spacer. Because the clamp spacers 160 space the power braid 170 somewhat apart from the conductive contact 172, via the base portions 162 of the spacers 160, clearance is provided along the conductive contact 172 for an insulating sheath 174 of the power braid 170. Thus, an exposed portion of the power braid 170 can be clamped to the contact 172 with part of the insulating sheath 174 also extending along (i.e., overlapping with) the conductive contact 172. Thus, for example, less of the power braid 170 may need to be exposed to provide an appropriate engagement with the conductive contact 172, and a shorter overall connection to the conductive contact 172 may be effected that might otherwise be possible. This can provide improved protection against accidental shorts due to inadvertent contact with the power braid 170 (e.g., via openings in a removable boot or other cover) and may also allow contractors to implement bends on the power braid 170 closer to the conductive contact 172, with corresponding benefits for space management and avoidance of sharp bending radii. In the illustrated embodiment, a thickness of the base portions 162 of the spacers 160 is substantially equal to or greater than (i.e., equal or greater than to within 5% tolerances) a local thickness of the insulating sheath 174. Thus, when the clamps 152 secure the power braid 170 to the conductive contact 172, a firm clamping connection can be obtained through the base portions 162 of the clamp spacers 160 without excessive (e.g., any) compression of the insulating sheath 174. However, other configurations are possible, including configurations in which a clamp spacer is sized to allow or require substantial compression of an insulating sheath.

Figure 11:
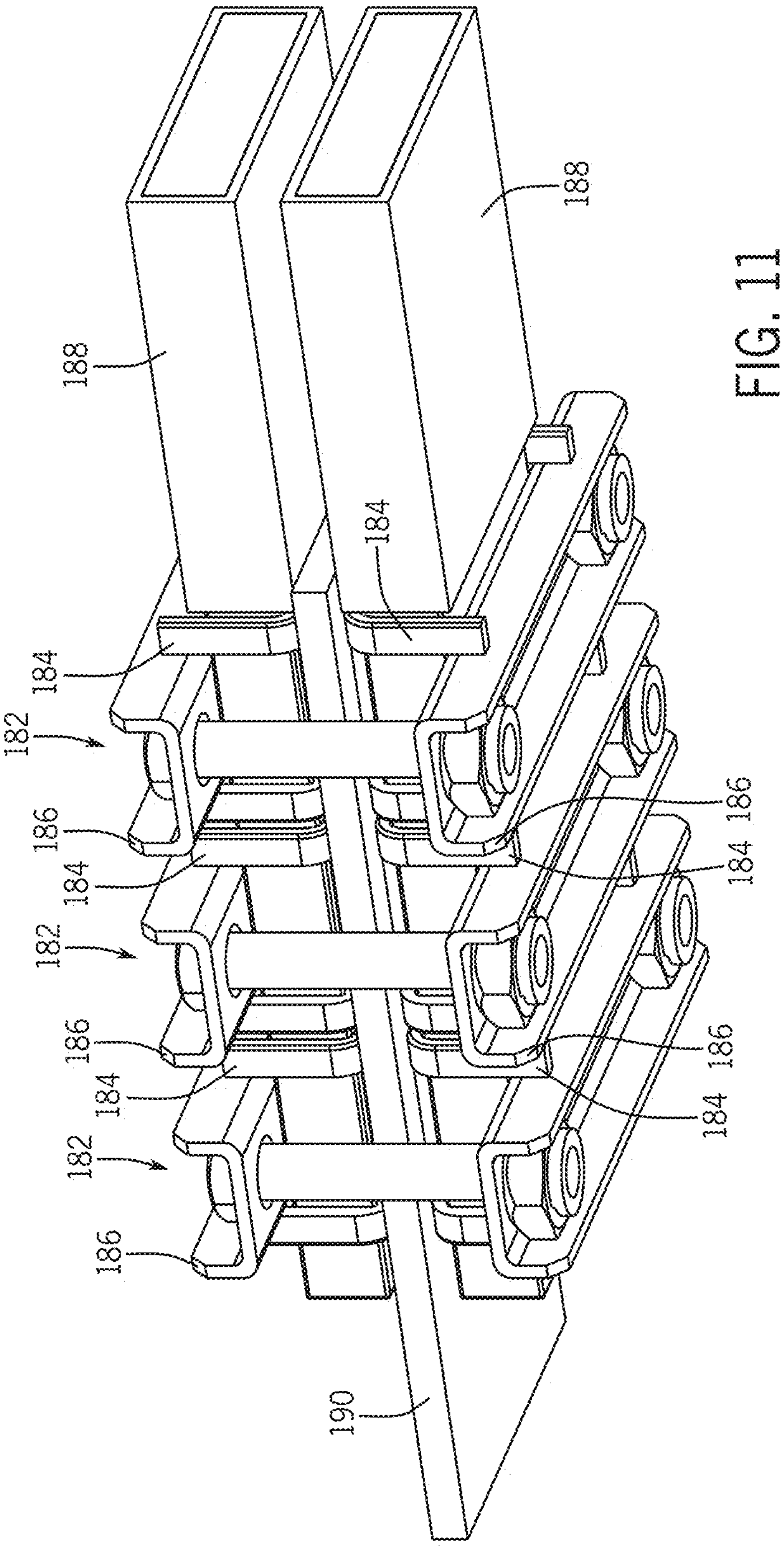

In some embodiments, a clamp can be configured to secure multiple power conductors, sometimes with a corresponding increase in the number of clamp spacers employed. For example, FIG. 11 shows a set of clamps 182 that are generally similar to the clamps 152 (see, e.g., FIG. 10) but each of which include a set of two clamp spacers 184 in addition to the two clamp bodies 186. With this arrangement, a set of two power braids 188 (or other conductors) can be secured on opposing sides of a conductive contact 190, with a respective one of the clamp spacers 184 providing spacing, retention, and protection against excessive deformation for each of the power braids 188. In the illustrated configuration, three of the clamps 182 are used to provide a particularly robust and conductive connection between the power braids 188 and the conductive contact 190, with the legs of the spacers 184 of each of the clamps 182 extending in opposite directions away from the conductive contact 190. However, other configurations are also possible. Similarly, in the illustrated embodiment, the power braids 188 are secured on opposing sides of the contact 190, although other configurations may be possible.

Figure 12:
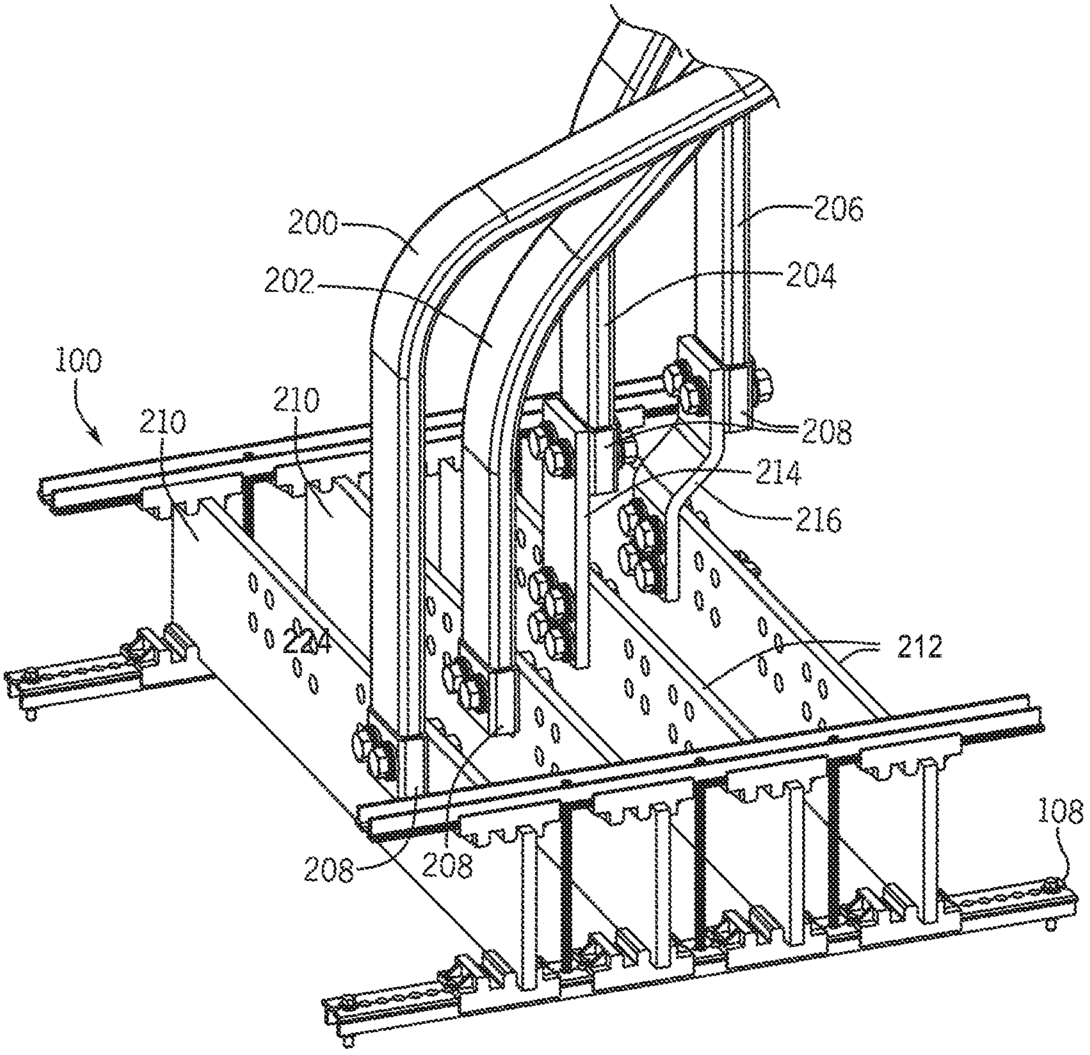

In other embodiments, as also noted above, other types of connections can be implemented in order to provide conductive engagement between a power conductor and a conductive contact. In some embodiments, rather than (or in addition to) being cut and stripped to provide an exposed portion for clamped engagement (e.g., as shown in FIGS. 10 and 11) a conductor can be equipped with an adapter for a bolt-on or other connection. For example, as shown in FIG. 12, a set of power braids 200, 202, 204, 206 are configured with adapters 208 that can be crimped or otherwise attached onto ends of the power braids 200, 202, 204, 206. In the illustrated embodiment, the adapters 208 are configured with bolt holes (not shown) and accordingly can be secured to distribution plates 210 via direct bolted connections (e.g., as shown for the power braids 200, 202) or can be secured to distribution plates 212 using a straight or angled extenders 214, 216 (e.g., as shown for the power braids 204, 206). In other embodiments, however other types of adapters, extenders, or connections in general can be used.

Figure 13A:
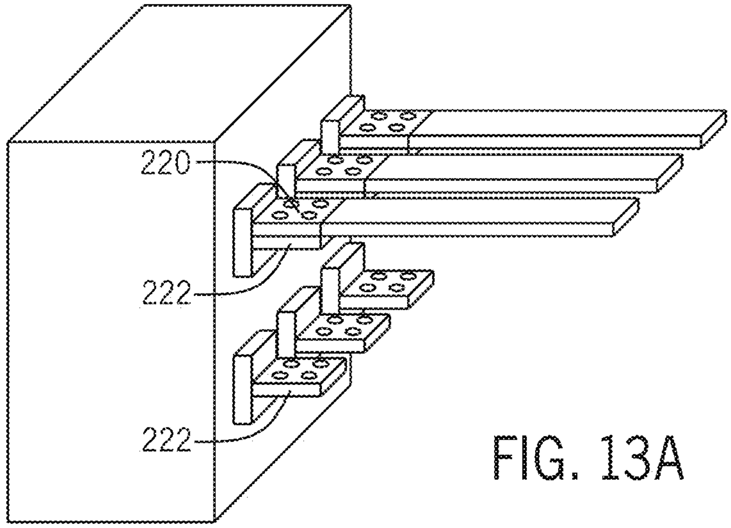
Figure 13B:
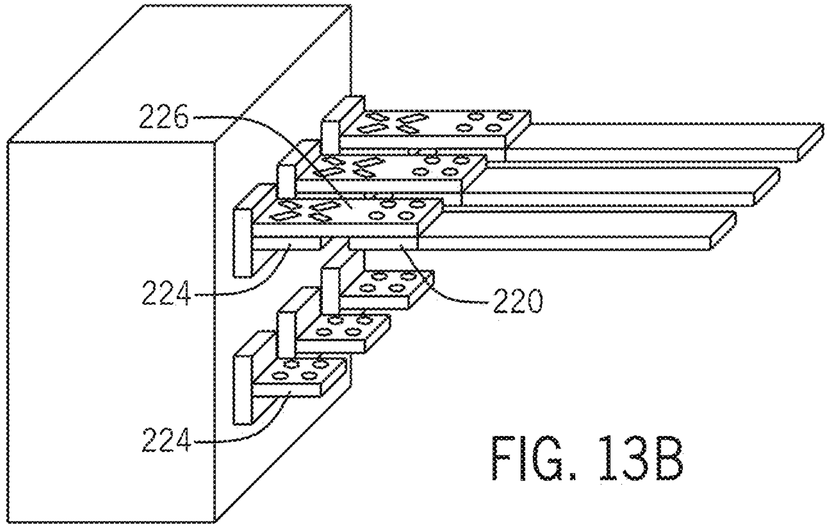
Figure 13C:
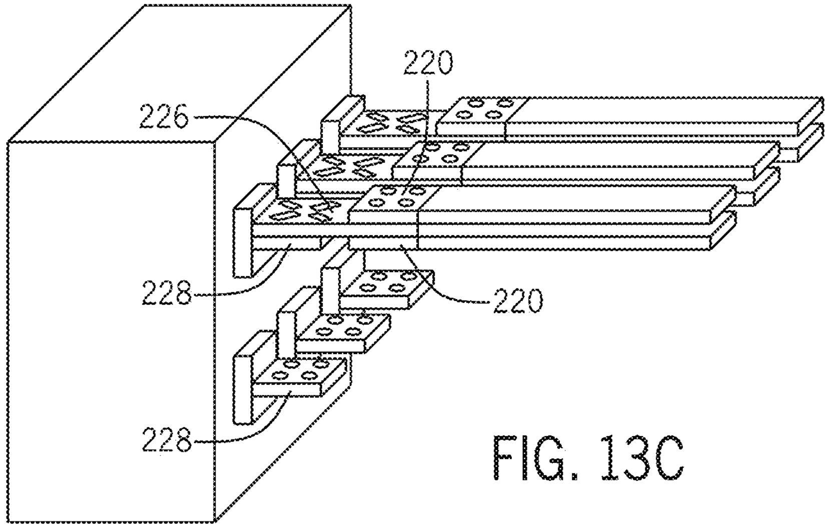

In the examples illustrated in FIG. 12, the adapters 208 generally provide a two-bolt connection with the respective power braids 200, 202, 204, 206. In other embodiments, however, other configurations are possible. For example, as shown in FIG. 13A through 13C, some adapters 220 can be configured for four-bolt (or other) connections, including for direct attachment to conductive contacts 222 (see FIG. 13A), or connection to conductive contacts 224 via extenders 226 with square, butterfly, or other hole patterns (see FIG. 13B).

In some embodiments, as similarly described with regard to FIG. 11, adapters for power conductors can also allow multiple power conductors to be secured to the same conductive contact. For example, as further illustrated in FIG. 13C, the adapters 220 can allow multiple power conductors to be secured to opposing sides of the extenders 226, with the extenders 226 then providing conductive engagement with conductive contacts 228.

As generally alluded to above, some embodiments of low voltage power conductor systems according to the invention, including systems that include power braids or clamps as discussed above, (e.g., the power braid 120 of FIG. 2 or the clamps 152 of FIG. 5), may be installed significantly more quickly than existing systems. As illustrated by the tables of FIGS. 14A and 14B, the installation time for embodiments of a power braid can be significantly less than the installation time for equivalent copper or aluminum cables. For example, as also discussed above, the braided arrangement of copper-clad aluminum wires in power braids may help to enable each individual power braid to carry more current than a similarly sized copper or aluminum cable. As a result, as reflected in the schematic illustrations in FIGS. 14A and 14B, a reduced number of power braids can replace conventional copper and aluminum cables for a system of given power or current. Accordingly, use of power braids can reduce installation time, including by reducing the number of individual electrical connections that need to be formed.

Further, it may be easier to install each individual power braid than it is to install each individual copper or aluminum cable. For example, in part due to their braided structure and oblong profile, some power braids can be highly flexible and may have a near-zero bend radius. And, connection devices for power braids, including as discussed in detail above, can be configured for substantially easier installation than connection devices for other conductors. This may be useful, for example, so that one person may efficiently install a power braid alone or so that low voltage conductors may be installed more quickly in general than with conventional systems.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes, of implementing such capabilities, or installing disclosed components to support these purposes or capabilities. Similarly, express discussion of any method of using a particular device or system, unless otherwise indicated or limited, is intended to inherently include disclosure, as embodiments of the invention, of the utilized features and implemented capabilities of such device or system.

In this regard, some embodiments can include method of transferring electrical power between electrical modules, including via the installation of systems as illustrated in FIGS. 5 through 13C and otherwise disclosed herein. Thus, for example, a low voltage power conductor and a clamp can be provided, such as the power braids 142 and the clamps 152 of FIG. 5, for example. A clamp spacer can be arranged between the low voltage power conductor and a conductive contact of one of the electrical modules, with a base portion of the clamp spacer in contact with the low voltage power conductor and with at least two legs of the clamp spacer extending from opposing sides of the base portion, away from the conductive contact, along opposing sides of the low voltage power conductor. The low voltage power conductor can then be clamped to the conductive contact, with the base portion of the clamp spacer providing an electrical connection between the low voltage power conductor and the conductive contact, and with the at least two legs of the clamp spacer limiting deformation of the low voltage power conductor upon compression of the low voltage power conductor by the clamping operation.

In some embodiments, a low voltage power conductor can include an insulating sheath having an insulation thickness. Correspondingly, in some implementations, a base portion of the clamp spacer, with a thickness that is substantially equal to or greater than the insulation thickness, can be arranged to contact the low voltage power conductor over an exposed portion of the low voltage power conductor. Thus, for example, the low voltage power conductor can be arranged so that the insulating sheath overlaps with a conductive contact adjacent to the clamp spacer, while still allowing for appropriate conductive contact between the low voltage power conductor and the conductive contact and avoiding excessive compression or other wear on the insulating sheath.

In some embodiments, two low voltage power conductors can be provided, including with the conductors arranged on opposite sides of a conductive contact. Respective clamp spacers to provide electrical conduction between the low voltage power conductors and the conductive contact can then be arranged with a base portion of each of the clamp spacers in contact with the respective low voltage power conductor, on opposite sides of the conductive contact, and with at least two legs of each of the clamp spacers extending in opposite directions, from opposing sides of the respective base portion, to extend along opposing sides of the respective low voltage power conductor.

In some embodiments, a single clamp can be tightened to collectively secure multiple low voltage power conductors to a conductive contact. In some cases, a single clamp can include multiple clamp spacers, each associated with a respective one of the low voltage power conductors.

Thus, embodiments of the invention provide an improved power distribution system and low voltage power conductor. In some embodiments, for example, a low voltage power conductor can include at least one flexible, lightweight power braid, which may enable a quicker and easier installation process and improved carrying capacity as compared to conventional designs. As another example, some embodiments can include power clamps that are configured to quickly secure lower voltage power conductors to conductive contacts while also preventing excessive deformation of the conductors during clamping.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A power conductor for a power distribution system, the power conductor comprising:

a plurality of copper-clad aluminum wires that are braided together to form a power braid, the power braid having an oblong cross-section with a cross-sectional area that is between 25 square millimeters and 3000 square millimeters, and the power braid being configured to carry an electrical current that is between 25 amperes and 5000 amperes; and an insulating sheath enclosing at least a portion of the power braid.

2. The power conductor of claim 1, wherein the power braid has a rectangular cross-section.

3. The power conductor of claim 1, wherein at least one of the plurality of copper-clad aluminum wires are coated in a layer of tin.

4. The power conductor of claim 1, wherein the power braid has at least one of a rounded cross-section, a rounded-rectangular cross-section, or an ovular cross section.

5. The power conductor of claim 1, wherein each of the plurality of copper-clad aluminum wires has a diameter that is between 0.5 millimeters and 3 millimeters.

6. The power conductor of claim 1, wherein the oblong cross-section has a cross-sectional area that is between 50 square millimeters and 1250 square millimeters.

7. The power conductor of claim 1, wherein the power braid is configured to carry an electrical current that is at least one of: between 400 amperes and 5000 amperes; between 50 amperes and 2000 amperes; or between 100 amperes and 2000 amperes.

8. The power conductor of claim 1, wherein the plurality of copper-clad aluminum wires are grouped together form at least one bundle, the at least one bundle being configured as a twisted bundle or braided bundle.

9. The power conductor of claim 8, wherein the at least one bundle includes more than 200 copper-clad aluminum wires.

10. The power conductor of claim 1, wherein the plurality of copper-clad aluminum wires are grouped together to form a plurality of bundles that are braided together.

11. The power conductor of claim 1, wherein the insulating sheath is configured to withstand an operational voltage that is between 300 volts and 3000 volts.

12. A power distribution system comprising:

a transformer including a conductive palm;

a power distribution module including a conductive contact; and a flexible power conductor being configured to electrically connect to the conductive palm of the transformer and to the conductive contact of the power distribution module, the flexible power conductor including a plurality of copper-clad aluminum wires that are braided together to form a power braid with an oblong cross-section with a cross-sectional area that is between 25 square millimeters and 3000 square millimeters, the power braid being configured to carry an electrical current that is between 25 amperes and 5000 amperes.

13. The power distribution system of claim 12, further comprising:

a plurality of flexible power conductors that includes the flexible power conductor, each of the plurality of flexible power conductors being formed of braided copper-clad aluminum wires and being configured to connect between a corresponding conductive palm of the transformer and a corresponding conductive contact of the power distribution module.

14. The power distribution system of claim 12, wherein the transformer is rated for between 2000 kVA and 2500 KVA; and wherein one of:

the flexible power conductor is one of two flexible power conductors that are configured to collectively carry a current that is between 2816 amperes and 3520 amperes the flexible power conductor is configured to collectively carry a current that is between 2816 amperes and 3520 amperes.

15. The power distribution system of claim 12, wherein the power braid is configured to carry an electrical current that is between 900 amperes and 2253 amperes.

16. The power distribution system of claim 12, wherein the flexible power conductor is secured to the conductive palm with a clamp.

17. The power distribution system of claim 12, wherein the flexible power conductor includes an adapter that is secured the power braid.

18. The power distribution system of claim 17, wherein the adapter is configured to secure the flexible power conductor to a distribution plate with at least one of a bolt-on or a crimped connection.

19. The power distribution system of claim 12, wherein the flexible power conductor further includes an insulating sheath surrounding a portion of the power braid so that an exposed portion of the power braid can be secured to the conductive palm.

20. A method of installing a power conductor for use in a power distribution system at an operational site, the method comprising the steps of:

securing a first end of a power conductor to a conductive palm of a transformer, the power conductor including a plurality of copper-clad aluminum wires that are braided together to form a power braid with a cross-sectional area that is between 25 square millimeters and 3000 square millimeters;

bending the power conductor at the operational site to move a second end of the power conductor toward a power distribution module; and securing the second end of the power conductor to a conductive contact of the power distribution module to electrically connect the transformer to the power distribution module.

* * * * *